US006792561B1

(12) United States Patent
Mamata (10) Patent No.: US 6,792,561 B1
(45) Date of Patent: Sep. 14, 2004

(54) APPARATUS AND METHOD FOR CONTROLLING ACCESS TO EXPANSION MEMORY FOR A COMPUTER SYSTEM

(75) Inventor: Tohru Mamata, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 636 days.

(21) Appl. No.: 09/691,025

(22) Filed: Oct. 19, 2000

(30) Foreign Application Priority Data

Oct. 20, 1999 (JP) .......................................... 11-298041

(51) Int. Cl.[7] .............................................. G06F 11/00
(52) U.S. Cl. .......................................... 714/36; 714/42
(58) Field of Search ............................... 714/36–42, 47; 710/58, 60, 62–63, 64, 301, 308

(56) References Cited

U.S. PATENT DOCUMENTS

| 5,471,587 | A | * | 11/1995 | Fernando | ..................... 710/307 |
|---|---|---|---|---|---|
| 5,564,054 | A | * | 10/1996 | Bramnick et al. | ............. 713/2 |
| 5,566,325 | A | * | 10/1996 | Bruce et al. | ................ 711/167 |
| 5,727,182 | A | | 3/1998 | Fukushima et al. | |
| 5,787,294 | A | * | 7/1998 | Evoy | .......................... 713/320 |
| 6,519,698 | B1 | * | 2/2003 | Leyda et al. | .................... 713/2 |
| 6,529,967 | B1 | * | 3/2003 | Robertson | ..................... 710/16 |
| 6,530,001 | B1 | * | 3/2003 | Lee | ............................. 711/154 |
| 2001/0026487 | A1 | * | 10/2001 | Koga | ......................... 365/202 |

FOREIGN PATENT DOCUMENTS

JP          11-96069          4/1999

* cited by examiner

Primary Examiner—Scott Baderman
(74) Attorney, Agent, or Firm—Finnegan, Henderson, Farabow, Garrett & Dunner, L.L.P.

(57) ABSTRACT

An apparatus and method for controlling a start operation for a computer system is provided for. The computer system includes at least one slot for mounting an expansion memory module and a memory bus coupled to the slot. The memory module has a specified operating frequency and the memory bus has an established operating frequency. In order to prevent malfunctions of the computer system due to the mounting of an improper expansion memory module, which has a specified operating frequency that is not in conformity with the established operating frequency for the memory bus, the apparatus controls the POST operation depending on the comparison of the specified operating frequency of the mounted memory module in the slot and the established operating frequency for the memory bus.

17 Claims, 4 Drawing Sheets

APPARATUS AND METHOD FOR CONTROLLING ACCESS TO EXPANSION MEMORY FOR A COMPUTER SYSTEM

BACKGROUND OF THE INVENTION

1. Field of the Invention

The present invention relates to apparatus and a method for controlling access to expansion memory for a computer system, more particularly, for avoiding malfunctions in the computer system due to improper installation of expansion memory that has a specified operating frequency different from an operating frequency for a data transfer bus in the computer system.

2. Discussion of the Related Art

With the widespread use and diversification in the data processing of computer systems, in particular, in personal computers, there have been strong demands for increasing the data processing speed of the computer system and also for increasing the amount of data that can be processed in the computer system.

Increasing the data processing speed has been achieved by increasing the clock frequency of operation for a central processing unit (hereinafter "CPU") in the computer system. It is further achieved by increasing the operating frequency of the installed data transfer bus in the computer system.

With respect to increasing the amount of data processed, this has been achieved by adding expansion memory to the installed memory in the computer system. The addition of expansion memory to a personal computer (PC) system can be achieved by installing an expansion memory card or module into a memory slot provided in the PC system.

In the same way a CPU has a particular operating frequency, a particular operating frequency is also designated for the expansion memory module. Usually, the conventional expansion memory module has an operating frequency of 66 MHz. Recently, in order to increase the operation speed, expansion memory having an operating frequency of 100 MHz has been introduced in the market.

Generally, expansion memory is supplied as a memory module or card which includes a memory body portion and a storage portion for storing attribute information including a particular operating frequency for the memory module. The attribute information storage portion of the memory module is formed by an erasable programmable read-only memory (EPROM).

The connector configuration of a memory slot for installing a memory module or card which has a operating frequency of 100 MHz (hereinafter, simply referred to as a "100 MHz memory module") has the same configuration of the memory slot for a memory module or card which has a conventional operating frequency of 66 MHz (hereinafter, simply referred to as a "66 MHz memory module").

Consequently, it is easy to install the wrong or improper expansion memory module, which has a different operating frequency from the established operating frequency for the computer system, into the memory slot. For example, even when the operating frequency for a memory bus in the PC system is established as 100 MHz, the expansion memory slot for the PC can install the 66 MHz memory module. If an improper memory module, having a different operating frequency from the established operating frequency for the memory bus, has been installed in the expansion memory slot, malfunctions would be generated due to the timing differences of the data transfer between the memory bus and the expansion memory module.

In particular, if the PC system has a plurality of expansion memory slots, installing an improper memory module, which has a different operating frequency from the established operating frequency for the PC system, could easily happen. For example, if the PC system has two expansion memory slots, both for the 66 MHz memory module, a 100 MHz memory module can erroneously be installed in either slot. If the improper memory module is installed in an expansion memory slot, the conventional computer system can potentially malfunction by mounting the wrong memory module into a memory expansion slot due to the difference of the operating frequencies between the data transferring memory bus and the added expansion memory module.

Therefore, there is a need for an apparatus and method to prevent malfunctions from occurring in the computer system if an improper memory module, having a different specified operating frequency from the operating frequency of the computer system, has been mounted in the computer system.

SUMMARY OF THE INVENTION

The system and method according to the present invention solves the aforementioned problems and defects of the conventional memory control system and method by providing for a memory control system and method for reliably achieving a memory access control when different expansion memory modules are installed in a memory slot for increasing the memory capacity for the system.

According to the present invention, a computer system is provided for controlling access to expansion memory including a plurality of slots for mounting memory modules, each having attribute information including a specified operating frequency for the memory module; a memory bus commonly coupled to the plurality of slots for exchanging data to and from the plurality of memory modules at an established operating frequency; a first logic unit configured to read each of the specified operating frequencies for each of the plurality of memory modules; a second logic unit configured to determine whether or not each of the specified operating frequencies being read by the first logic unit is in conformity with the established operating frequency for the memory bus; and a third logic unit configured to control a start examining operation of the computer system in accordance with the determination by the second logic unit.

There is also provided a method for controlling access to a set of expansion memory modules having attribute information including a respective specified operating frequency in a computer system including reading the specified operating frequency for the memory modules; comparing an operating frequency of the computer system with the specified operating frequency for the memory modules; and controlling a start operation of the computer system based on the comparison.

There is also provided a computer system comprising a mounting module for mounting a memory module having attribute information including a specified operating frequency; an exchanging module for exchanging data at an established operating frequency to and from the memory module mounted in the mounting module; a reading module for reading the specified operating frequency in the attribute information for the memory module mounted in the mounting module; a determining module for determining whether or not the read specified operating frequency for the mounted memory module is in conformity with the established operating frequency for the data exchanging module; and a controlling module for controlling a start examining operation of the computer system in accordance with the determination by the determining module.

Further, there is provided a method for controlling access to memory modules in a computer system, which includes a memory bus for coupling the memory module, including reading a specified operating frequency for the memory module mounted in the slot; determining whether or not the specified operating frequency for the memory module is in conformity with an established operating frequency for the memory bus; and controlling the operation of the memory module based on a result of the determination.

Additional objects and advantages of the invention will be set forth in the description that follows, and in part will be obvious from that description, or may be learned by practicing the invention. The objects and advantages of the invention may be realized and obtained by means of the instrumentalities and combinations particularly pointed out in the appended claims.

Both the foregoing general description and the following detailed description are exemplary and explanatory only and do not restrict the present invention as claimed. The foregoing merely provides further explanation of the claimed invention. The accompanying drawings, which are incorporated in and constitute a part of this specification, illustrate embodiments of the present invention and, together with the description, explain the principles of the present invention.

BRIEF DESCRIPTION OF THE DRAWINGS

A more complete appreciation of the present invention and many of the advantages thereof will be obtained as the same becomes better understood by reference to the following detailed description when considered in connection with the accompanying drawings in which like reference numerals designate identical or corresponding parts or steps throughout the figures.

DETAILED DESCRIPTION

Methods and systems consistent with the present invention provide for access control of expansion memory modules for computer systems. This control can prevent malfunctions from occurring when an improper memory module is mounted or inserted in an expansion memory slot of a computer system.

Figure 1:
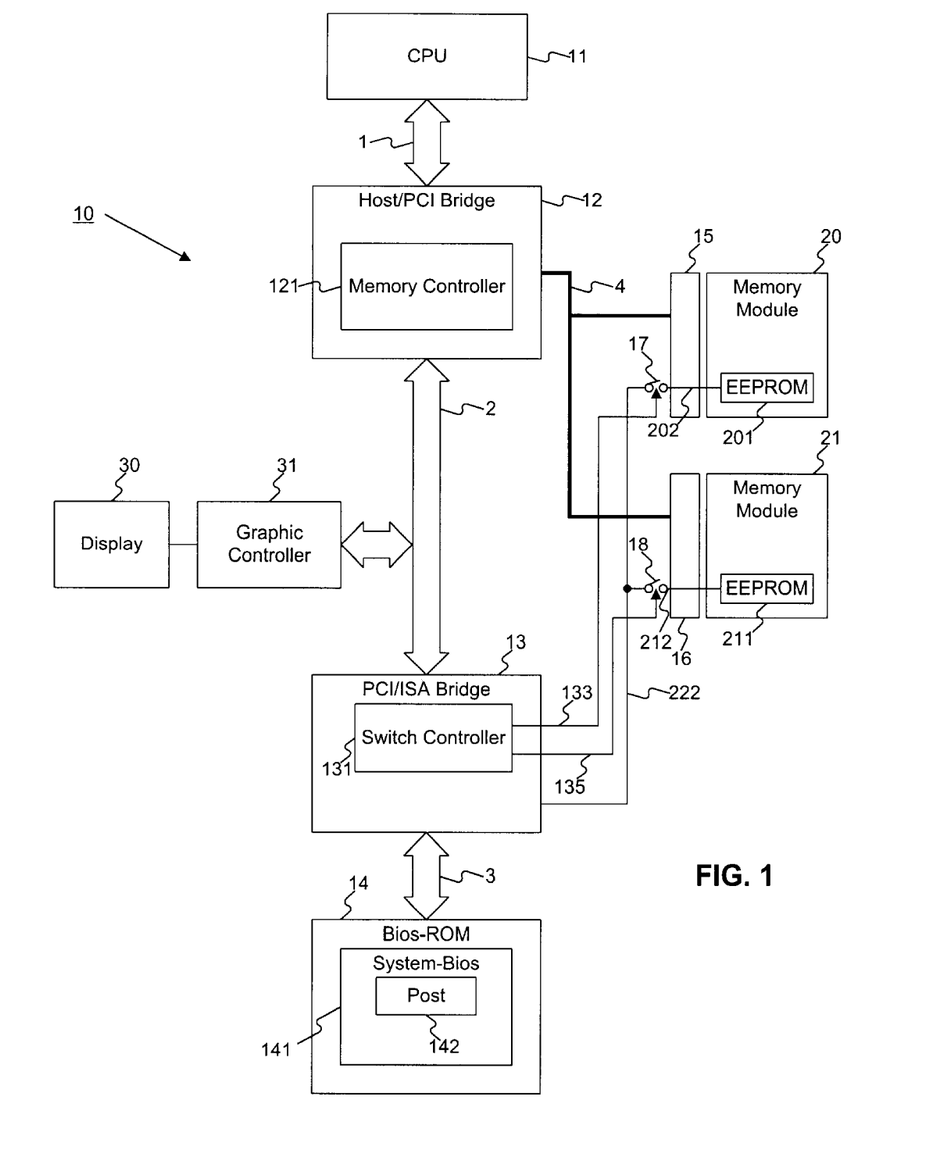
FIG. 1 depicts a block diagram of the main components of a computer system, consistent with the present invention.

FIG. 1 illustrates the main components of a memory control apparatus, consistent with the present invention. This memory control apparatus can be implemented in a computer system such as a laptop or a note book personal computer (PC) system or any computer system, which typically has two memory slots for expansion memory modules. It can be appreciated by one skilled in the art that the computer system can provide for more or less than two slots for expansion memory.

The main components of the memory control apparatus contained in the PC system 10 are comprised of a CPU 11, a Host-PCI bridge 12, a Peripheral Component Interconnect/ Industry Standard Architecture (PCI/ISA) bridge 13, a BIOS-ROM 14, a first expansion memory slot 15, a second expansion memory slot 16, a first analog switch 17, a second analog switch 18, a CPU(processor) bus 1, a Peripheral Component Interconnect (PCI) bus 2, an Industry Standard Architecture (ISA) bus 3, and a memory bus 4. A first expansion memory module 20 is installed in the first expansion memory slot 15 and a second expansion memory module 21 is installed in the second expansion memory slot 16.

The CPU 11 controls the execution of application programs, including programs in the system BIOS 141, based on the control of an operating system (OS). The Host-PCI bridge 12 is a bridge device for bi-directionally coupling the CPU bus 1 and the PCI bus 2. The Host-PCI bridge 12 contains memory controller 121. The first and second expansion memory slots 15, 16 are commonly coupled to the memory controller 121 in the Host-PCI bridge 12 through the memory bus 4 for controlling access to the expansion memory modules 20, 21 installed in the respective slots 15, 16.

The expansion memory slots 15, 16 have the same connector configuration for installing both of the expansion memory modules 20, 21, each of which may or may not have a different specified operating frequency with each other. For example, the memory module 20 installed in the first expansion memory slot 15 can have a specified operating frequency of 66 MHz, and the memory module 21 installed in the second expansion memory slot 16 can have a specified operating frequency of 100 MHz.

For the purpose of describing the present invention, the memory bus 4 in the computer system 10 is designated so as to operate at an established operating frequency of 100 MHz. That is, the memory controller 121 controls access to and from the first and second expansion memory modules 20, 21 through the memory bus 4 having a designated operating frequency of 100 MHz.

Of course, it is possible to change the designated operating frequency for the memory bus 4. In order to change the designated operating frequency for the memory bus 4, the memory controller 121 selects a desired clock signal that is generated from a clock generator (not shown) for operating the memory bus 4.

Each of the memory modules 20, 21 is comprised of a plurality of SDRAM chips mounted on a base plate. Further, the respective memory modules 20, 21 include electrically erasable and programmable read-only memory (EEPROM)s 201, 211, for storing attribute information for the respective memory modules. The attribute information can include a specified operating frequency for the memory module, memory size, name of manufacturer, or any other type of information describing the modules. The detailed methods for storing the attribute information in the EEPROMs in the memory module and for reading the information are disclosed in the PC SDRAM Serial Presence Detect (SPD) Specification, Revision 1.2A, issued by Intel on December 1997.

Each of the first and second expansion memory slots 15, 16 includes a signal line for reading the data from each of the EEPROMs in the memory modules. As shown in FIG. 1, the data reading signal line 202 provided in the first expansion memory slot 15 reads the data in the EEPROM 201 for the memory module 20. The signal line 202 is coupled to the PCI-ISA bridge 13 through a first analog switch 17. Similarly, the data reading signal line 212 provided in the second expansion memory slot 16 for reading the data in the EEPROM 211 for the memory module card 21 is coupled to the PCI-ISA bridge 13 through a second analog switch 18. It is possible to use a serial bus, such as a I²C bus as the data reading signal lines 202 and 212.

The ON/OFF operations of the first and second analog switches 17, 18 are controlled by switching signals 133, 135 from the switching control circuit 131 provided in the PCI/ISA bridge 13. Thus, the first and second analog switches 17, 18 are turned on/off by the switching signals 133, 135 from the switching control circuit 131. Consequently, it becomes possible to access the EEPROM 201 in the first expansion memory module 20 and to the EEPROM 211 in the second expansion memory module 21.

As explained above, in the expansion memory control apparatus according to the present invention, it is possible to read the respective operating frequency specified for the respective memory modules from the respective EEPROM 201, 211 through the data reading signal lines 202 and 212. Data reading signal lines 202, 212 are independent from memory bus 4. Thus, it becomes possible to normally control access to the expansion memory even when an improper expansion memory module, which has a different specified operating frequency for the memory module from the computer system, would be mounted in the expansion memory slot by independently reading the specified operating frequency through the signal lines 202, 212.

The PCI/ISA bridge 13 connects bi-directionally between the PCI bus 2 and the ISA bus 3. As explained above, the switching control circuit 131 controls ON/OFF operations of the analog switches 17,18 for accessing the EEPROMs 201, 211 in order to read the specified operating frequency in through the buses 202, 212. The controls of the ON/OFF operations of the analog switches 17, 18 and the access to the EEPROMs 210, 211 are executed by a system BIOS 141 provided in the Basic I/O System (BIOS)-ROM 14.

A display monitor 30 can be included in the system for displaying a warning message regarding the installation of an improper expansion memory module having a different operating frequency from an established operating frequency for the computer system. The system BIOS 141 controls the display of a message on the monitor 30. Thus, in order to display the message, the monitor 30 is coupled to the system BIOS 141 through a graphic controller 31, the PCI bus 2 and the ISA bus 3.

The BIOS-ROM 14 is comprised of flash memories, which are capable of writing over the programs. The BIOS-ROM 14 stores the system BIOS 141, and can operate under the real mode.

The system BIOS 141 includes the POST (Power-ON Self Test) routine 142 for self-checking normal operations of the hardware devices in the computer system when the main power switch is on or when the computer system is restarted. Further, the system BIOS 141 includes device drivers for controlling the various I/O devices, a BIOS setup routine for establishing system environments, and the system managing programs of the run time for executing various SMI (Structure of Management Information) operations.

The POST routine 142 includes the normal hardware checking routines and initializing routines. Further the POST routine 142 includes a checking routine for examining the specified operating frequency for the expansion memory module and for displaying a message on the display monitor 15 when an improper expansion memory module, having a specified operating frequency different from the operating frequency of the computer system, has been mounted in the memory expansion slot.

Figure 2:
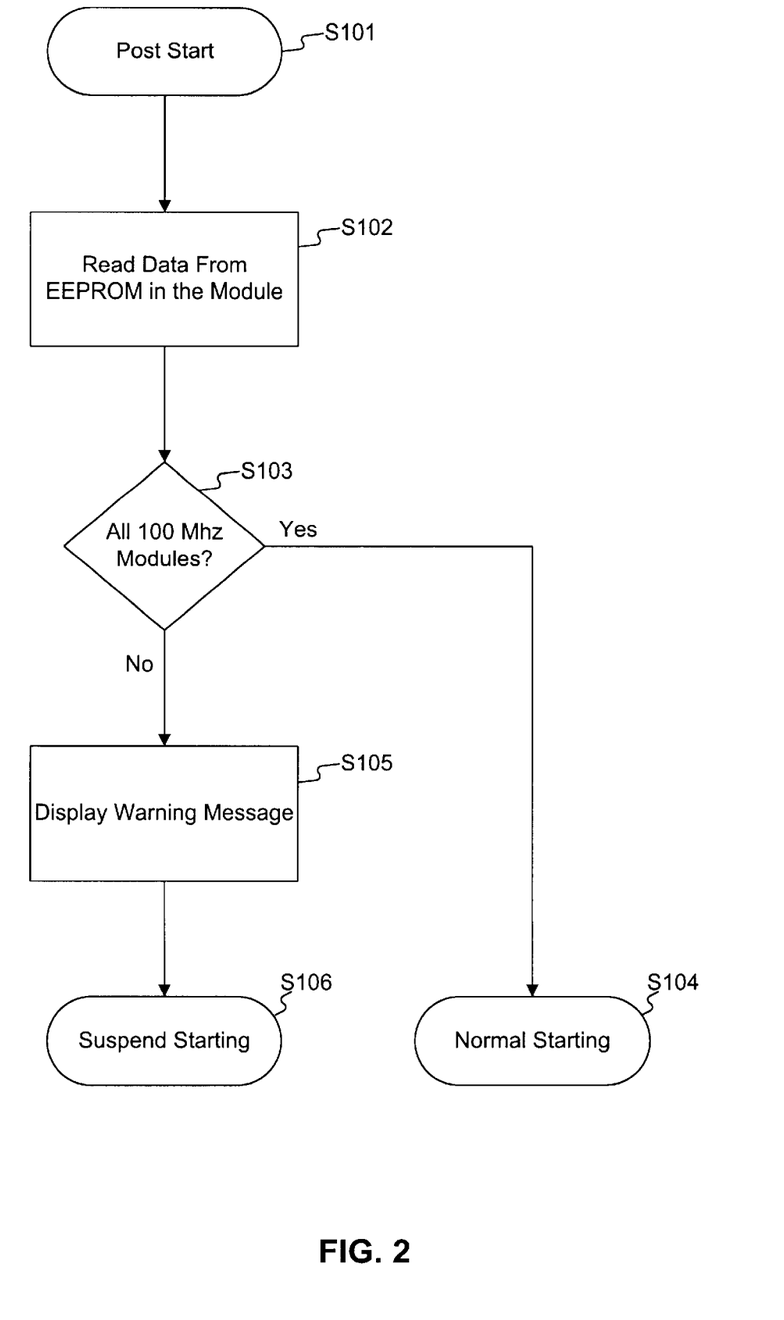
FIG. 2 depicts a flow chart of the steps performed for the start operation at the power ON of an embodiment of a computer system, consistent with the present invention.

FIG. 2 depicts a flow chart of the steps of the POST operation of the computer system consistent with the present invention.

When the main power for the computer system is turned on, the system BIOS is started and the POST operation is started (step S101).

The ON/OFF control operations for the analog switches are executed in order to access to the mounted expansion memory modules. Thus, the first and second analog switches 17, 18 are in turn switched on or off in order to read the attribute information for the respective expansion memory modules in EEPROMs 201, 211, which are respectively mounted on the first expansion memory slot 15 and the second expansion memory slot 16, (step S102). The read operation of the respective attribute information gives a specified operating frequency for the mounted expansion memory modules in the respective slots.

Next, based on the attribute information data, the system BIOS examines whether or not all of the operating frequencies for the respective memory modules mounted in the expansion memory slots are in conformity with the established operating frequency of 100 MHz for the computer system (step S103).

If all of the specified operating frequencies for the mounted memory modules are in conformity with the established operating frequency of 100 MHz (step S103, Yes), the computer enters to a normal starting operating for the mounted expansion memory modules (step S104).

On the other hand, if the system BIOS determines that the expansion memory has a different operating frequency, i.e., 66 MHz, which is not in conformity with the designated operating frequency, i.e., 100 MHz, for the computer system,(step S103, No), the system BIOS displays a warning message (step S105) on the display monitor 15 (FIG. 1). The system may also prompt a warning sound. After displaying the warning message, the system BIOS stops the starting operation (step S106).

The warning message displayed on the monitor 15 displays the reason for stopping the starting operation. The message may state that an improper expansion memory module, which has a different operating frequency from the designated one for the computer system, has been mounted in an expansion slot. The display can also advise a user, by displaying a message, to change or remove the improper expansion memory module on the display by, for example, specifying the particular slot that the memory module has been mounted in. In this embodiment, the operation of the computer system will not start unless the improper module is removed from the expansion slot.

It is also possible to warn the user the mounted memory module is improper by flashing a warning indicator provided on the computer system body, such as a light-emitting diode (LED).

According to the first embodiment, during the first POST routine, it is possible to detect an improper mounting of the expansion memory module having a different operating frequency from the designated operating frequency for the computer system. Thus, it becomes possible to prevent the malfunction of the system from occurring by stopping the starting operation.

Figure 3:
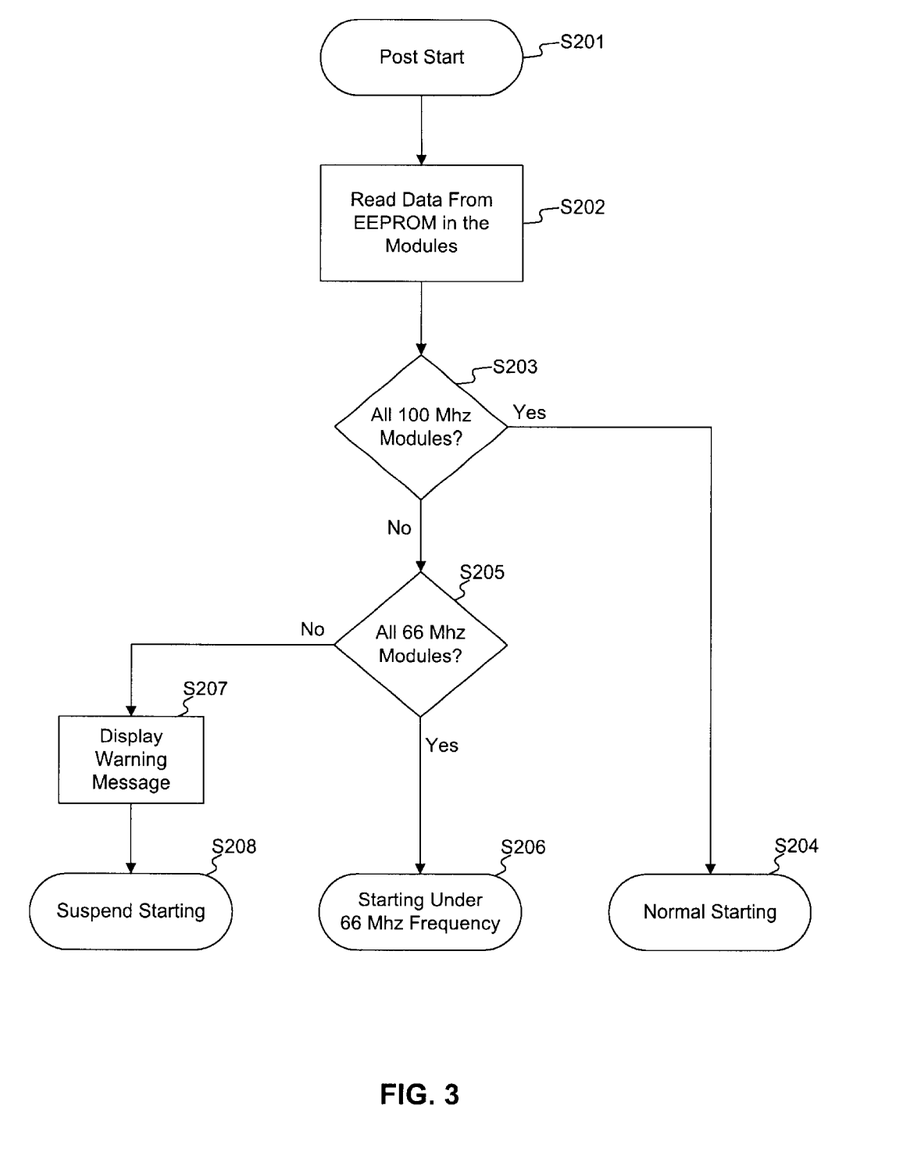
FIG. 3 depicts a flow chart of the steps performed for the start operation at the power ON of another embodiment of a computer system, consistent with the present invention.

FIG. 3 is a flow chart for explaining a second embodiment of the present invention.

In the first embodiment, when an expansion memory module has a different operating frequency from the designated operating frequency of the system, the operation of the computer system does not start unless the improper expansion memory module has been removed from the slot.

In the second embodiment according to the present invention, the computer system can start its operation by partially adding limits for the operation, depending upon the conditions of the mounted expansion memory modules.

The second embodiment of the invention can be implemented in the same computer system shown in FIG. 1. For the purpose of explaining the second embodiment, the standard operating frequency for the memory bus 4 can be established at 100 MHz. Further, we can establish the operating frequency of the memory modules at 66 MHz or 100 MHz.

When the power source of the computer system is turned on, the system BIOS 141 starts the POST operation (step S201). By turning on or off the first analog switch 17 and the second analog switch 18 in a predetermined order, the attribute information stored in EEPROMs 201, 211 is read for the respective memory modules 20, 21 mounted in the respective first expansion memory slot 15 and second expansion memory slot 16 (step S202).

Based on the attribute information data, i.e., the specified operating frequencies for the respective memory modules, the system BIOS 141 examines whether or not all of the operating frequencies for the respective memory modules mounted on the expansion memory slots are in conformity with the standard operating frequency i.e., 100 MHz, established for the computer system (step S203).

If all of the operating frequencies for the mounted memory modules are in conformity with the standard operating frequency, i.e., 100 MHz (step S203, Yes), the computer proceeds with a normal starting operation for the mounted expansion memory modules (step S204).

If the system BIOS 141 determines that one of the memory modules has a different operating frequency, i.e., of 66 MHz, which is not in conformity with the standard operating frequency designated for the computer system, i.e., 100 MHz, (step S203, No), the system BIOS 141 examines whether or not all of the operating frequencies for the respective memory modules mounted on the expansion memory slots have a different operating frequency from the system's operating frequency (step S205).

If the system BIOS determines that all of the operating frequencies for the all of memory modules are not in conformity with the established operating frequency for the memory bus (step S205, Yes), and they all have the same operating frequency, i.e., 66 MHz, the memory controller 121 changes the established operating frequency for the memory bus to the operating frequency of the expansion memory modules, i.e., 66 MHz, and the system BIOS executes the start operation for the computer system (step S206) at the new operating frequency.

Thus it becomes possible to utilize the memory module having the specified operating frequency of 66 MHz that is different from the established operating frequency of 100 MHz for the memory bus by changing the established operating frequency for the memory bus to the specified operating frequency of the memory modules of 66 MHz during the start or POST operation for the system.

The system can also display a message advising the user of the change of the established operating frequency for the memory bus to 66 MHz in order to consider the change of the mounted memory module.

If the system BIOS determines that a mounted memory module has a specified operating frequency of 66 MHz and the other mounted memory module has a specified operating frequency of 100 MHz (step S205, No), a warning message is displayed on the display monitor 15 (step S207) and a warning beep sound can also be generated. After displaying the warning message, the system BIOS stops the POST operation (step S208).

If the system BIOS determines that it is possible to operate the 100 MHz memory module at the operating frequency of 66 MHz and also that the 100 MHz memory module and the 66 MHz memory module are mounted in the plurality of the slots (step S205, No), the system BIOS continues the POST operation by changing the established operating frequency for the memory bus to the specified operating frequency of 66 MHz for all of the memory modules without stopping the POST operation.

The system can provide an option to the user to select between the different embodiments i.e., changing the operating frequency or providing for less expanded memory. If the stop of the POST operation is selected, a step can be added for inputting the user's selection between the step (S205, No) and the step (S207), or after the step (S207). When the selection step is added after the step S207, the user can select which is more important, either the usable memory amount or the operating frequency. If the user selects to change the operating frequency, the POST start operation proceeds to step S206.

Figure 4:
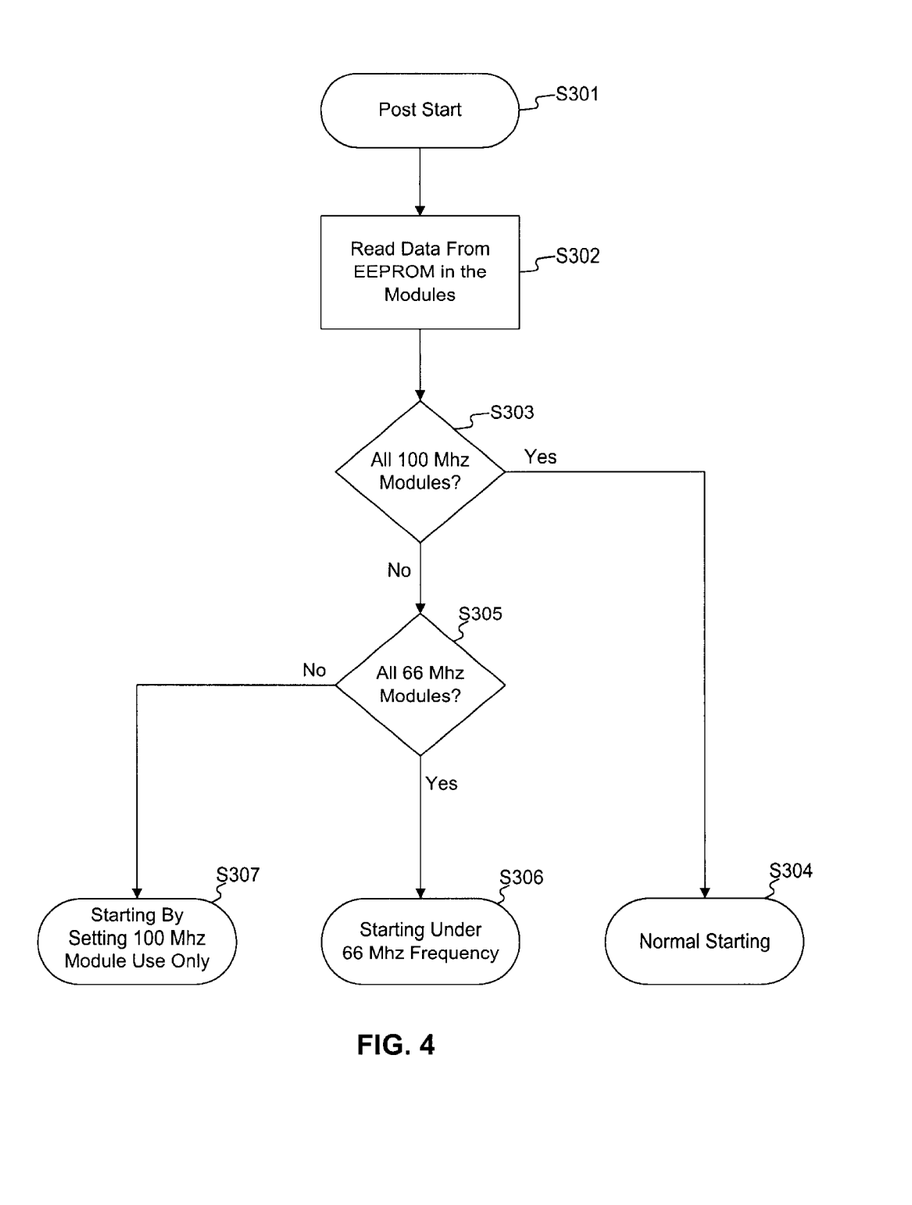
FIG. 4 depicts a flow chart of the steps performed for the start operation at the power ON of yet another embodiment of a computer system, consistent with the present invention.

FIG. 4 describes the third embodiment of the invention.

As similar to the second embodiment, the third embodiment continues the POST operation by modifying some operations of the system depending on the attribute information of the mounted memory modules. For the purpose of describing this embodiment, we can set the operating frequency for the memory bus 4 at 100 MHz.

When a source power of the computer system is turned on, the system BIOS 141 starts the POST operation (step S301). By turning on or off the first analog switch 17 and the second analog switch 18 in a predetermined order, the attribute information is read from EEPROMs 201, 211 for the respective memory modules which are mounted in the first expansion memory slot 15 and second expansion memory slot 16 respectively (step S302).

Based on the attribute information data, i.e., the specified operating frequencies for the respective memory mode, the system BIOS 141 examines whether or not all of the operating frequencies for the respective memory modules mounted on the expansion memory slots are in conformity with the standard operating frequency of 100 MHz established for the computer system (step S303).

If all of the operating frequencies for the mounted memory modules are in conformity with the standard operating frequency of 100 MHz (step S303, Yes), the computer enters to a normal starting operation for the mounted expansion memory modules (step S304).

If the system BIOS determines that some of the memory modules have an operating frequency of, i.e., 66 MHz, which is not in conformity with the standard operating frequency of 100 MHz designated for the computer system, (step S303, No), the system BIOS 141 examines whether or not all of the operating frequencies for the respective memory modules mounted on the expansion memory slots are a particular operating frequency, i.e. 66 MHz (step S305).

If the system BIOS determines that all of the operating frequencies for the mounted memory modules are the same operating frequency i.e., 66 MHz, which is not in conformity with the established operating frequency for the memory bus i.e., 100 MHz (step S305, Yes), the memory controller 121 changes the established operating frequency for the memory bus to the operating frequency for the expansion memory modules, i.e., 66 MHz, and the system BIOS continues the start operation for the computer system (step S306).

If the system BIOS determines that one of the memory modules has a specified operating frequency of, i.e., 66 MHz, and the other memory module has a specified operating frequency of 100 MHz, and both are mounted in the expansion slots 15, 16 (step S305, No), the system BIOS executes the start operation of the memory controller for operating the 100 MHz memory module only (step S307). It is possible to display a warning message notifying the user that an improper memory module has been mounted in the slot.

According to the third embodiment of the invention, even when an improper memory module is mounted in an expansion slot, it is possible to start the operation of the computer system without having malfunctions occur in the system due to the mounting of the memory module having a specified operating frequency that is different from the established operating frequency for the computer system.

Similar to the second embodiment, it is possible to change the established operating frequency for the memory bus to 66 MHz if the system BIOS determines that one of the modules operates at 66 MHz and the other module operates at 100 MHz (step S305, No).

This method is also applicable when the 100 MHz memory module is capable of operating at 66 MHz. A user can select to use the 100 MHz memory module only or the change the operating frequency to a frequency that is shared by the plurality of memory modules.

As explained above, the memory controlling apparatus according to the present invention and method thereof is characterized in that the apparatus controls controlling the POST operation in accordance with a determination between the specified operating frequency for the mounted memory module in the slot and the established operating frequency for the memory bus in order to prevent malfunctions of the computer system due to mounting an improper expansion memory module, which has a specified operating frequency that is not in conformity with the established operating frequency for the memory bus.

Other embodiments of the present invention will be apparent to those skilled in the art from consideration of the specification and practice of the invention disclosed herein. In particular, the invention is applicable to any types of personal computers. It is intended that the specification and examples be considered as exemplary only, with a true scope and sprit of the invention being indicated by the following claims.

I claim:

1. A method for controlling access to a set of expansion memory modules having attribute information including a specified operating frequency in a computer system, comprising the steps of:
   reading the specified operating frequency for the memory modules;
   comparing an operating frequency of the computer system with the specified operating frequency for the memory modules; and
   controlling a start operation of the computer system based on the comparison.

2. The method of claim 1, wherein controlling the start operation of the computer system further comprises:
   determining that the specified frequency of each of the memory modules does not conform with the operating frequency of the computer system; and
   suspending the start operation based on the determination.

3. The method of claim 1, wherein controlling the start operation further comprises:
   determining that the specified frequency of each of the memory modules conform with the operating frequency of the computer system; and
   performing the start operation based on the determination.

4. The method of claim 1, wherein controlling the start operation further comprises:
   determining that the specified frequency of at least one of the set of memory modules does not conform with the operating frequency of the computer system; and
   suspending the start operation based on the determination.

5. A method for controlling access to a set of expansion memory modules having attribute information including a specified operating frequency in a computer system, comprising the steps of:
   reading the specified operating frequency for the memory modules;
   comparing an operating frequency of the computer system with the specified operating frequency for the memory modules;
   controlling a start operation of the computer system based on the comparison,
   wherein controlling the start operation further comprises:
   determining that the specified frequency of at least one of the set of memory modules conforms with the operating frequency of the computer system;
   commencing a start operation based on the determination; and
   denying access to the memory module that has the different specified frequency from the operating frequency of the computer system.

6. A method for controlling access to a set of expansion memory modules having attribute information including a specified operating frequency in a computer system, comprising the steps of:
   reading the specified operating frequency for the memory modules;
   comparing an operating frequency of the computer system with the specified operating frequency for the memory modules;
   controlling a start operation of the computer system based on the comparison,
   wherein controlling the start operation further comprises:
   determining that the specified frequency of each of the memory modules does not conform with the operating frequency of the computer system;
   determining that the specified frequency is the same for all memory modules; and
   modifying the operating frequency of the computer system to match the specified frequency of the memory modules.

7. The method of claim 1, wherein controlling the start operation further comprises:
   determining that the specified frequency of at least one of the memory modules does not conform with the operating frequency of the computer system; and
   commencing the start operation while operating the non-conforming memory module at the operating frequency of the computer system.

8. A computer system comprising:
   a mounting module for mounting a memory module having attribute information including a specified operating frequency;

an exchanging module for exchanging data at an established operating frequency to and from the memory module mounted in the mounting module;

a reading module for reading the specified operating frequency in the attribute information for the memory module mounted in the mounting module;

a determining module for determining whether or not the read specified operating frequency for the mounted memory module is in conformity with the established operating frequency for the data exchanging module; and a controlling module for controlling a start examining operation of the computer system in accordance with the determination by the determining module.

9. The computer system of claim 8, wherein the controlling module prohibits the start examining operation of the computer system when the determining module determines that the specified operating frequency for the mounted memory module is not in conformity with the established operating frequency for the data exchanging module.

10. The computer system of claim 8, further comprising:

a changing module for changing the established operating frequency for the data exchanging module, whereby the changing module changes the established operating frequency for the data exchanging module to the specified operating frequency for the memory module when the determining module determines that the specified operating frequency for the mounted memory module is not in conformity with the standard operating frequency established for the data exchanging module.

11. The computer system of claim 8, further comprising:

a display;

whereby the display displays information as to the mounted memory module having the specified operating frequency which is not in conformity with the established operating frequency for the data exchanging module.

12. A computer system comprising:

a plurality of slots for mounting memory modules, each having attribute information including a specified operating frequency for the memory module;

a memory bus commonly coupled to the plurality of slots for exchanging data to and from the plurality of memory modules at an established operating frequency;

a first logic unit configured to read each of the specified operating frequencies for each of the plurality of memory modules;

a second logic unit configured to determine whether or not each of the specified operating frequencies being read by the first logic unit is in conformity with the established operating frequency for the memory bus; and a third logic unit configured to control a start examining operation of the computer system in accordance with the determination by the second logic unit.

13. The computer system of claim 12, wherein the third logic unit prohibits the start examining operation when the second logic unit determines that the specified operating frequency for the memory module is not in conformity with the established operating frequency for the memory bus.

14. A computer system comprising:

a plurality of slots for mounting memory modules, each having attribute information including a specified operating frequency for the memory module;

a memory bus commonly coupled to the plurality of slots for exchanging data to and from the plurality of memory modules at an established operating frequency;

a first logic unit configured to read each of the specified operating frequencies for each of the plurality of memory modules;

a second logic unit configured to determine whether or not each of the specified operating frequencies being read by the first logic unit is in conformity with the established operating frequency for the memory bus;

a third logic unit configured to control a start examining operation of the computer system in accordance with the determination by the second logic unit; and a fourth logic unit configured to change the designated operating frequency for the memory bus;

whereby the fourth logic unit changes the designated operating frequency for the memory bus to a commonly specified operating frequency for some of the plurality of memory modules when the second logic unit determines that some of the plurality of the operating frequency for the plurality of memory modules are not in conformity with the established operating frequency for the memory bus.

15. The computer system of claim 14, wherein the fourth logic unit changes the established operating frequency for the memory bus to an operating frequency commonly specified for the plurality of memory modules when the second logic unit determines that all of the specified operating frequencies for the plurality of memory modules are the same but are not in conformity with the established operating frequency for the memory bus.

16. The computer system of claim 12, further comprising:

a display;

whereby the display displays information as to the memory module having the specified operating frequency, which is not in conformity with the established operating frequency for the memory bus.

17. A method for controlling access to a memory module in a computer system, which includes a memory bus for coupling the memory module, comprising the steps of:

reading a specified operating frequency for the memory module mounted in a slot;

determining whether or not the specified operating frequency for the memory module is in conformity with an established operating frequency for the memory bus; and controlling the operation of the memory module based on a result of the determination, wherein the controlling step prohibits a start examining operation when the determining step determines that the specified operating frequency for the memory module is not in conformity with the established operating frequency for the memory bus.

* * * * *